United States Patent
Du et al.

(10) Patent No.: US 11,147,118 B2
(45) Date of Patent: Oct. 12, 2021

(54) COMMUNICATION METHOD, APPARATUS, AND SYSTEM

(71) Applicant: HUAWEI TECHNOLOGIES CO., LTD., Guangdong (CN)

(72) Inventors: Jun Du, Shanghai (CN); Zhiming Pan, Shanghai (CN)

(73) Assignee: Huawei Technologies Co., Ltd., Guangdong (CN)

(*) Notice: Subject to any disclaimer, the term of this patent is extended or adjusted under 35 U.S.C. 154(b) by 43 days.

(21) Appl. No.: 16/703,725

(22) Filed: Dec. 4, 2019

(65) Prior Publication Data

US 2020/0107391 A1    Apr. 2, 2020

Related U.S. Application Data

(63) Continuation of application No. PCT/CN2017/087335, filed on Jun. 6, 2017.

(51) Int. Cl.
*H04W 76/27* (2018.01)
*H04W 76/11* (2018.01)
*H04W 68/00* (2009.01)

(52) U.S. Cl.
CPC ......... *H04W 76/27* (2018.02); *H04W 68/005* (2013.01); *H04W 76/11* (2018.02)

(58) Field of Classification Search
CPC ... H04W 76/27; H04W 76/11; H04W 68/005; H04W 24/04
See application file for complete search history.

(56) References Cited

U.S. PATENT DOCUMENTS

| | | | |
|---|---|---|---|
| 2014/0128075 A1 | 5/2014 | Da Silva et al. | |
| 2016/0262179 A1 | 9/2016 | Choi et al. | |
| 2018/0049022 A1* | 2/2018 | Johansson | H04W 8/24 |
| 2018/0070300 A1* | 3/2018 | Kim | H04W 48/18 |
| 2018/0146452 A1 | 5/2018 | Zhang et al. | |
| 2018/0213579 A1* | 7/2018 | Hong | H04W 76/10 |
| 2019/0082364 A1* | 3/2019 | Zhang | H04W 76/16 |
| 2019/0166526 A1 | 5/2019 | Xu et al. | |

(Continued)

FOREIGN PATENT DOCUMENTS

| | | |
|---|---|---|
| CN | 101883407 A | 11/2010 |
| CN | 105144782 A | 12/2015 |

(Continued)

OTHER PUBLICATIONS

Extended European Search Report issued in European Application No. 17913070.3 dated Feb. 21, 2020, 25 pages.

(Continued)

*Primary Examiner* — Farid Seyedvosoghi
(74) *Attorney, Agent, or Firm* — Fish & Richardson P.C.

(57) ABSTRACT

A communication method provided in embodiments of this application is a method for establishing an RRC connection between a terminal and a RAN, and the establishment of the RRC connection includes first RRC connection establishment and second RRC connection establishment. The first RRC connection establishment is a wireless RRC connection between the terminal and a first RAN network element, and the second RRC connection establishment is a wireless or wired RRC connection between the first RAN network element and a second RAN network element.

26 Claims, 8 Drawing Sheets

(56) References Cited

U.S. PATENT DOCUMENTS

2019/0223251 A1   7/2019  Jiang et al.
2019/0350026 A1*  11/2019 Liu ...................... H04W 76/15
2020/0068631 A1   2/2020  Rui et al.

FOREIGN PATENT DOCUMENTS

| CN | 105594259 A | 5/2016 |
| --- | --- | --- |
| CN | 106162730 A | 11/2016 |
| CN | 106332152 A | 1/2017 |
| CN | 106538037 A | 3/2017 |
| WO | 2012167496 A1 | 12/2012 |
| WO | 2017010693 A1 | 1/2017 |
| WO | 2018202189 A1 | 11/2018 |

OTHER PUBLICATIONS

Nokia et al., "Radio protocol aspects for LTE operation with NextGen core," 3GPP TSG-RAN WG2 Meeting #97, R2-1701869, Athens, Greece, Feb. 13-17, 2017, 4 pages.

Office Action issued in Chinese Application No. 201780091586.9 dated May 8, 2020, 28 pages (with English translation).

SK Telecom et al., "Considerations on function split for 5G deployment," 3GPP TSG-RAN3 Meeting #96, R3-171971, Hangzhou, P. R. China, May 15-19, 2017, 6 pages.

3GPP TS 36.331 V14.2.2 (Apr. 2017), 3rd Generation Partnership Project, Technical Specification Group Radio Access Network, Evolved Universal Terrestrial Radio Access (E-UTRA), Radio Resource Control (RRC), Protocol specification (Release 14), 721 pages.

PCT International Search Report and Written Opinion in International Application No. PCT/CN2017/087,335, dated Jan. 31, 2018, 18 pages (Wtih English Translation).

* cited by examiner

COMMUNICATION METHOD, APPARATUS, AND SYSTEM

CROSS-REFERENCE TO RELATED APPLICATIONS

This application is a continuation of International Application No. PCT/CN2017/087335, filed on Jun. 6, 2017, the disclosure of which is hereby incorporated by reference in its entirety.

TECHNICAL FIELD

Embodiments of this application relate to the communications field, and in particular, to a communication method, apparatus, and system.

BACKGROUND

A cloud radio access network (Cloud Radio Access Network, CloudRAN) is a new wireless network architecture obtained through reconstruction of a RAN by using a cloud technology. The CloudRAN includes a RAN convergence unit (RAN Convergence Unit, RANCU) and a RAN distribution unit (RAN Distribution Unit, RANDU). Currently, there is no method for establishing a radio resource control (radio resource control, RRC) connection between a terminal and a cloud radio access network.

SUMMARY

Embodiments of this application provide a communication method, apparatus, and system, so that an RRC connection can be established between a terminal and a RAN.

A first aspect of the embodiments of this application provides a communication method, and the communication method is used in a communications system. The communications system includes a RAN, for example, a CloudRAN. The RAN includes a first RAN network element and a second RAN network element, and the first RAN network element and the second RAN network element are interconnected. The method includes: determining, by the first RAN network element after receiving a first message from a terminal, to establish an RRC connection, where the first message is used to request the first RAN network element to establish an RRC connection between the terminal and the RAN; sending, by the first RAN network element, a response message of the first message to the terminal, where the response message of the first message is used to notify the terminal that the establishment of the RRC connection between the terminal and the RAN is determined; sending, by the first RAN network element, a second message to the second RAN network element, to request the second RAN network element to configure a resource for the establishment of the RRC connection of the terminal; and receiving, by the first RAN network element, a response message of the second message from the second RAN network element, where the response message of the second message includes a resource parameter configured by the second RAN network element for the terminal.

When determining to establish the RRC connection based on the first message, a first network element sends the response message of the first message to the terminal. Optionally, after determining to establish the RRC connection based on the first message, the first RAN network element sends the response message of the first message to the terminal. A specific time at which the response message of the first message is sent is not limited in this application.

It can be learned that, an RRC connection establishment process between the terminal and the RAN provided in the embodiments of this application includes first RRC connection establishment and second RRC connection establishment, where the first RRC connection establishment is a wireless RRC connection between the terminal and the first RAN network element, and the second RRC connection establishment is a wireless or wired RRC connection between the first RAN network element and the second RAN network element. Therefore, the first RAN network element determines that the establishment of the RRC connection is allowed between the terminal and the RAN, and the second RAN network element configures the resource for the establishment of the RRC connection between the terminal and the RAN, to establish the RRC connection between the terminal and the RAN.

To establish the RRC connection between the terminal and the RAN, with reference to the first aspect, in a possible implementation, the second message includes a first identifier, and the first identifier is allocated by the first RAN network element and is used to identify the terminal within a range of the first RAN network element; or the response message of the second message includes the first identifier and a second identifier, and the second identifier is allocated by the second RAN network element and is used to identify the terminal within a range of the second RAN network element. Therefore, the first RAN network element and the second RAN network element establish, based on the first identifier and the second identifier, links between the first RAN network element and the second RAN network element and the RAN for the terminal, to implement the establishment of the RRC connection establishment process between the terminal and the RAN. With reference to the foregoing possible implementation, in another possible implementation, the first RAN network element receives a third message sent by the terminal, where the third message is used to notify the first RAN network element that the establishment of the RRC connection is complete. Therefore, after receiving the third message, the first RAN network element may learn that the establishment of the RRC connection between the terminal and the RAN is complete.

With reference to the foregoing possible implementations, in another possible implementation, the second message may be further used to notify a second network element that the establishment of the RRC connection is complete.

For example, the first message is a first RRC connection establishment request message, the response message of the first message is a first RRC connection establishment message, the third message is a first RRC connection establishment complete message, and the second message is a second RRC connection establishment complete message. It can be learned that the second message including related information (for example, the first identifier) of a radio resource allocated by the first RAN network element to the terminal may be a second RRC connection establishment complete message that is used by the first RAN network element to notify the second RAN network element, and therefore, signaling can be saved when the establishment of the RRC connection between the terminal and the RAN is implemented. In addition, a delay for establishing a connection link is also effectively reduced.

With reference to the foregoing possible implementations, in another possible implementation, the first RAN network element sends a fourth message to the second RAN network element, where the fourth message is used to notify the second RAN network element that the establishment of the RRC connection is complete. Therefore, after receiving the fourth message, the second RAN network element learns that the establishment of the RRC connection between the terminal and the RAN is complete, and then the terminal may continue to perform another communication such as context establishment.

For example, the first message is a first RRC connection establishment request message, the response message of the first message is a first RRC connection establishment message, the third message is a first RRC connection establishment complete message, the second message is a second RRC connection establishment request message or a second RRC connection establishment message, and the fourth message is a second RRC connection establishment complete message. It can be learned that the second message including related information (for example, the first identifier) of a radio resource allocated by the first RAN network element to the terminal may further be a second RRC connection establishment request message or a second RRC connection establishment message, and therefore signaling can be saved when the establishment of the RRC connection between the terminal and the RAN is implemented. A delay for establishing a connection link is also effectively reduced. In addition, an establishment process of the first RAN network element and the terminal and an establishment process of the first RAN network element and the second RAN network element may be further performed simultaneously or alternately, so that a delay for the establishment can be more effectively reduced when the establishment of the RRC connection between the terminal and the RAN is implemented.

A second aspect of the embodiments of this application provides a communication method, and the communication method is used in a communications system. The communications system includes a RAN. The RAN includes a first RAN network element and a second RAN network element, and the first RAN network element and the second RAN network element are interconnected. The method includes: receiving, by the second RAN network element, a second message from the first RAN network element, where the second message is used to request the second RAN network element to configure a resource for establishment of an RRC connection of a terminal, a first message is a message that is received by the first RAN network element from the terminal before the first RAN network element sends the second message to the second RAN network element, and the first message is used to request the establishment of the RRC connection between the terminal and the RAN; and sending, by the second RAN network element, a response message of the second message to the first RAN network element, where the response message of the second message includes a resource parameter configured by the second RAN network element for the terminal. It can be learned that, an RRC connection establishment process between the terminal and the RAN provided in the embodiments of this application includes first RRC connection establishment and second RRC connection establishment, where the first RRC connection establishment is a wireless RRC connection between the terminal and the first RAN network element, and the second RRC connection establishment is a wireless or wired RRC connection between the first RAN network element and the second RAN network element. Therefore, the first RAN network element determines that the establishment of the RRC connection is allowed between the terminal and the RAN, and the second RAN network element configures the resource for the establishment of the RRC connection between the terminal and the RAN, to establish the RRC connection between the terminal and the RAN.

With reference to the second aspect, in a possible implementation, the second message includes a first identifier, and the first identifier is allocated by the first RAN network element and is used to identify the terminal within a range of the first RAN network element; or the response message of the second message includes the first identifier and a second identifier, and the second identifier is allocated by the second RAN network element and is used to identify the terminal within a range of the second RAN network element. Therefore, the first RAN network element and the second RAN network element establish, based on the first identifier and the second identifier, links between the first RAN network element and the second RAN network element and the RAN for the terminal, to implement the RRC connection establishment process between the terminal and the RAN.

With reference to the foregoing possible implementation, in another possible implementation, the second RAN network element receives a fourth message from the first RAN network element, where the fourth message is used to notify the second RAN network element that the establishment of the RRC connection is complete, a third message is a message that is received by the first RAN network element from the terminal before the first RAN network element sends the fourth message to the second RAN network element, and the third message is used to notify the first RAN network element that the establishment of the RRC connection is complete. Therefore, after receiving the third message, the first RAN network element learns that the establishment of the RRC connection between the terminal and the RAN is complete. After receiving the fourth message, the second RAN network element learns that the establishment of the RRC connection is complete. In this case, after the establishment of the RRC connection between the terminal and the RAN is complete, the terminal may continue to perform another communication such as context establishment.

A third aspect of the embodiments of this application provides a communication method, and the communication method is used in a communications system. The communications system includes a radio access network RAN. The RAN includes a first RAN network element and a second RAN network element, and the first RAN network element and the second RAN network element are interconnected. The method includes: sending, by a terminal, a first message to the first RAN network element, where the first message is used to request establishment of an RRC connection between the terminal and the RAN; and receiving, by the terminal, a response message of the first message from the first RAN network element, where the response message of the first message is used to notify the terminal that the establishment of the RRC connection between the terminal and the RAN is determined. Therefore, the terminal sends, to the first RAN network element, the first message used to request the establishment of the RRC connection between the terminal and the RAN, and the first RAN network element determines that the establishment of the RRC connection is allowed between the terminal and the RAN, to establish the RRC connection between the terminal and the RAN.

With reference to the third aspect, in a possible implementation, after the receiving, by the terminal, a response message of the first message from the first RAN network element, the method further includes: sending, by the terminal, a third message to the first RAN network element, where the third message is used to notify the first RAN network element that the establishment of the RRC connection is complete, and a second message is a message sent by the first RAN network element to the second RAN network element when the first RAN network element determines to establish the RRC connection. Therefore, after receiving the third message, the first RAN network element learns that the establishment of the RRC connection between the terminal and the RAN is complete.

A fourth aspect of the embodiments of this application provides a communication method, and the communication method is used in a communications system. The communications system includes a radio access network RAN. The RAN includes a first RAN network element and a second RAN network element, and the first RAN network element and the second RAN network element are interconnected. The method includes: receiving, by the first RAN network element, a first request message from a terminal, where the first request message is used to request establishment of an RRC connection between the terminal and the RAN; configuring, by the first RAN network element, a radio resource for the establishment of the RRC connection of the terminal; sending, by the first RAN network element, a second request message to the second RAN network element, where the second request message is used to notify the second RAN network element that the terminal requests the establishment of the RRC connection to the RAN; receiving, by the first RAN network element, a response message of the second request message from the second RAN network element, where the response message of the second request message is used to notify the first RAN network element to determine to establish the RRC connection between the terminal and the RAN; sending, by the first RAN network element based on the response message of the second request message, a response message of the first request message to the terminal, where the response message of a first request is used to notify the terminal that the establishment of the RRC connection between the terminal and the RAN is determined; and receiving, by the first RAN network element, a first RRC connection establishment complete message sent by the terminal, where the first RRC connection establishment complete message is used to notify the first RAN network element that the establishment of the RRC connection is complete.

Optionally, after determining to establish the RRC connection based on the first request message, the first RAN network element configures the radio resource for the establishment of the RRC connection of the terminal. A specific time at which the radio resource is configured is not limited in this application.

Optionally, after determining to establish the RRC connection based on the first request message, the first RAN network element sends the second request message to the second RAN network element. A specific time at which the second request message is sent is not limited in this application.

It can be learned that, an RRC connection establishment process between the terminal and the RAN provided in the embodiments of this application includes first RRC connection establishment and second RRC connection establishment, where the first RRC connection establishment is a wireless RRC connection between the terminal and the first RAN network element, and the second RRC connection establishment is a wireless or wired RRC connection between the first RAN network element and the second RAN network element. The terminal sends, to the first RAN network element, the first request message used to request the establishment of the RRC connection between the terminal and the RAN, the first RAN network element sends, to the second RAN network element, the second request message used to request the establishment of the RRC connection between the terminal and the RAN, and the first RAN network element and the second RAN network element jointly determine to allow the establishment of the RRC connection between the terminal and the RAN, to establish the RRC connection between the terminal and the RAN.

To establish the RRC connection between the terminal and the RAN, with reference to the fourth aspect, in a possible implementation, the second request message carries a first identifier, and the first identifier is allocated by the first RAN network element and is used to identify the terminal within a range of the first RAN network element.

With reference to the foregoing possible implementation, in another possible implementation, the response message of the second request message carries the first identifier and a second identifier, and the second identifier is allocated by the second RAN network element and is used to identify the terminal within a range of the second RAN network element. Therefore, the first RAN network element and the second RAN network element establish, based on the first identifier and the second identifier, links between the first RAN network element and the second RAN network element and the RAN for the terminal, to implement the RRC connection establishment process between the terminal and the RAN.

With reference to the foregoing possible implementations, in another possible implementation, after the receiving, by the first RAN network element, a first RRC connection establishment complete message sent by the terminal, the method further includes: sending, by the first RAN network element, a second RRC connection establishment complete message to the second RAN network element, where the second RRC connection establishment complete message is used to notify the second RAN network element that the establishment of the RRC connection is complete. Therefore, after receiving the second RRC connection establishment complete message, the second RAN network element learns that the establishment of the RRC connection between the terminal and the RAN is complete, and then the terminal may continue to perform another communication such as context establishment.

A fifth aspect of the embodiments of this application provides a communication method, and the communication method is used in a communications system. The communications system includes a radio access network RAN. The RAN includes a first RAN network element and a second RAN network element, and the first RAN network element and the second RAN network element are interconnected. The method includes: receiving, by the second RAN network element, a second request message from the first RAN network element, where the second request message is used to notify the second RAN network element that a terminal requests establishment of an RRC connection to the RAN, a first request message is a message that is received by the first RAN network element from the terminal before the first RAN network element sends the second request message to the second RAN network element, and the first request message is used to request the establishment of the RRC connection between the terminal and the RAN; configuring, by the second RAN network element, a resource for the establishment of the RRC connection of the terminal; and sending, by the second RAN network element, a response message of the second request message to the first RAN network element, where the response message of the second request message is used to notify the first RAN network element to determine to establish the RRC connection between the terminal and the RAN.

It can be learned that, an RRC connection establishment process between the terminal and the RAN provided in the embodiments of this application includes first RRC connection establishment and second RRC connection establishment, where the first RRC connection establishment is a wireless RRC connection between the terminal and the first RAN network element, and the second RRC connection establishment is a wireless or wired RRC connection between the first RAN network element and the second RAN network element. The terminal sends, to the first RAN network element, the first request message used to request the establishment of the RRC connection between the terminal and the RAN, the first RAN network element sends, to the second RAN network element, the second request message used to request the establishment of the RRC connection between the terminal and the RAN, and the first RAN network element and the second RAN network element jointly determine to allow the establishment of the RRC connection between the terminal and the RAN, to establish the RRC connection between the terminal and the RAN.

To establish the RRC connection between the terminal and the RAN, with reference to the fifth aspect, in a possible implementation, the second request message includes a first identifier, and the first identifier is allocated by the first RAN network element and is used to identify the terminal within a range of the first RAN network element.

With reference to the foregoing possible implementation, in another possible implementation, the response message of the second request message includes the first identifier and a second identifier, and the second identifier is allocated by the second RAN network element and is used to identify the terminal within a range of the second RAN network element. Therefore, the first RAN network element and the second RAN network element establish, based on the first identifier and the second identifier, links between the first RAN network element and the second RAN network element and the RAN for the terminal, to implement the RRC connection establishment process between the terminal and the RAN.

With reference to the foregoing possible implementations, in another possible implementation, after the sending, by the second RAN network element, a response message of the second request message to the first RAN network element, the method further includes: receiving, by the second RAN network element, a second connection establishment complete message from the first RAN network element, a first RRC connection establishment complete message is a message that is received by the first RAN network element from the terminal before the first RAN network element sends the second connection establishment complete message to the second RAN network element, and the first RRC connection establishment complete message is used to notify the first RAN network element that the establishment of the RRC connection is complete, and a second RRC connection establishment complete message is used to notify the second RAN network element that the establishment of the RRC connection is complete. Therefore, after receiving the second RRC connection establishment complete message, the second RAN network element may learn that the establishment of the RRC connection between the terminal and the RAN is complete, and then the terminal may continue to perform another communication such as context establishment.

A sixth aspect of the embodiments of this application provides a communication method, and the communication method is used in a communications system. The communications system includes a radio access network RAN. The RAN includes a first RAN network element and a second RAN network element, and the first RAN network element and the second RAN network element are interconnected. The method includes: sending, by a terminal, a first request message to the first RAN network element, where the first request message is used to request establishment of an RRC connection between the terminal and the RAN; receiving, by the terminal, a response message of the first request message from the first RAN network element, where the response message of the first request message is used to notify the terminal that the establishment of the RRC connection between the terminal and the RAN is determined; and sending, by the terminal, a first RRC connection establishment complete message to the first RAN network element, where the first RRC connection establishment complete message is used to notify the first RAN network element that the establishment of the RRC connection is complete. Therefore, the terminal sends, to the first RAN network element, the first request message used to request the establishment of the RRC connection between the terminal and the RAN, and the first RAN network element and the second RAN network element jointly determine that the establishment of the RRC connection is allowed between the terminal and the RAN, to establish the RRC connection between the terminal and the RAN.

A seventh aspect of the embodiments of this application provides a first RAN network element. A communications system includes a radio access network RAN, the RAN includes the first RAN network element and a second RAN network element, and the first RAN network element and the second RAN network element are interconnected. The first RAN network element includes a receiving unit, configured to receive a first message from a terminal, where the first message is used to request establishment of an RRC connection between the terminal and the RAN; a processing unit, configured to determine, based on the first message, to establish the RRC connection; and a sending unit, configured to send a response message of the first message to the terminal, where the response message of the first message is used to notify the terminal that the establishment of the RRC connection between the terminal and the RAN is determined. The sending unit is further configured to send a second message to the second RAN network element, where the second message is used to request the second RAN network element to configure a resource for the establishment of the RRC connection of the terminal, and the receiving unit is further configured to receive a response message of the second message from the second RAN network element, where the response message of the second message includes a resource parameter configured by the second RAN network element for the terminal.

An eighth aspect of the embodiments of this application provides a second RAN network element. A communications system includes a radio access network RAN, the RAN includes a first RAN network element and the second RAN network element, and the first RAN network element and the second RAN network element are interconnected. The second RAN network element includes a receiving unit, configured to receive a second message from the first RAN network element, where the second message is used to request the second RAN network element to configure a resource for establishment of an RRC connection of the terminal; and a sending unit, configured to send a response message of the second message to the first RAN network element, where the response message of the second message includes a resource parameter configured by the second RAN network element for the terminal.

A ninth aspect of the embodiments of this application provides a terminal. A communications system includes a radio access network RAN, the RAN includes a first RAN network element and a second RAN network element, and the first RAN network element and the second RAN network element are interconnected. The terminal includes a sending unit, configured to send a first message to the first RAN network element, where the first message is used to request establishment of an RRC connection between the terminal and the RAN; and a receiving unit, configured to receive a response message of the first message from the first RAN network element, where the response message of the first message is used to notify the terminal that the establishment of the RRC connection between the terminal and the RAN is determined.

A tenth aspect of the embodiments of this application provides a first RAN network element. A communications system includes a radio access network RAN, the RAN includes the first RAN network element and a second RAN network element, and the first RAN network element and the second RAN network element are interconnected. The first RAN network element includes a receiving unit, configured to receive a first request message from a terminal, where the first request message is used to request establishment of an RRC connection between the terminal and the RAN; a processing unit, configured to configure a resource for the establishment of the RRC connection of the terminal; and a sending unit, configured to send a second request message to the second RAN network element, where the second request message is used to notify the second RAN network element that the terminal requests the establishment of the RRC connection to the RAN. The receiving unit is further configured to receive a response message of the second request message from the second RAN network element, where the response message of the second request message is used to notify the first RAN network element to determine to establish the RRC connection between the terminal and the RAN, the sending unit is further configured to send a response message of the first request message to the terminal based on the response message of the second request message, where the response message of a first request is used to notify the terminal that the establishment of the RRC connection between the terminal and the RAN is determined, and the receiving unit is further configured to receive a first RRC connection establishment complete message sent by the terminal.

An eleventh aspect of the embodiments of this application provides a second RAN network element. A communications system includes a radio access network RAN, the RAN includes a first RAN network element and the second RAN network element, and the first RAN network element and the second RAN network element are interconnected. The second RAN network element includes a receiving unit, configured to receive a second request message from the first RAN network element, where the second request message is used to notify the second RAN network element that a terminal requests establishment of an RRC connection to the RAN, a processing unit, configured to configure a resource for the establishment of the RRC connection of the terminal, and a sending unit, configured to send a response message of the second request message to the first RAN network element, where the response message of the second request message is used to notify the first RAN network element to determine to establish the RRC connection between the terminal and the RAN.

A twelfth aspect of the embodiments of this application provides a terminal. A communications system includes a radio access network RAN, the RAN includes a first RAN network element and a second RAN network element, and the first RAN network element and the second RAN network element are interconnected. The terminal includes a sending unit, configured to send a first request message to the first RAN network element, where the first request message is used to request establishment of an RRC connection between the terminal and the RAN; and a receiving unit, configured to receive a response message of the first request message from the first RAN network element, where the response message of a first request is used to notify the terminal that the establishment of the RRC connection between the terminal and the RAN is determined. The sending unit is further configured to send a first RRC connection establishment complete message to the first RAN network element.

It should be noted that, the function units in the seventh aspect to the twelfth aspect may be implemented by hardware, or may be implemented by executing corresponding software by hardware. The hardware or the software includes one or more modules corresponding to the functions. For example, a transceiver is configured to complete functions of the receiving unit and the sending unit, a processor is configured to complete functions of the processing unit, and a memory is configured to process a program instruction of the communication method in the embodiments of this application. The processor, the transceiver, and the memory are connected by using a bus and communicate with each other. Specifically, reference may be made to the function of the actions of the first RAN network element according to the communication method provided in the first aspect and the fourth aspect, the function of the actions of the second RAN network element according to the communication method provided in the second aspect and the fifth aspect, and the function of the actions of the terminal according to the communication method provided in the third aspect and the sixth aspect.

According to a thirteenth aspect, an embodiment of this application provides a computer device, including a processor, a memory, a bus, and a communications interface, where the memory is configured to store a computer executable instruction; the processor and the memory are connected by using the bus; and when the computer device is run, the processor executes the computer executable instruction stored in the memory, and the computer device is enabled to perform the method in any of the foregoing aspects.

According to a fourteenth aspect, an embodiment of this application provides a computer readable storage medium, configured to store a computer software instruction used in the foregoing method. When the computer software instruction is run on a computer, the computer is enabled to perform the method in any one of the foregoing aspects.

According to a fifteenth aspect, an embodiment of this application provides a computer program product including an instruction. When the instruction is run on a computer, the computer is enabled to perform the method in any one of the foregoing aspects.

In addition, for technical effects brought by any design manner of the seventh aspect to the fifteenth aspect, refer to technical effects brought by different design manners of the first aspect to the sixth aspect. Details are not described herein again.

In the embodiments of this application, names of the first RAN network element, the second RAN network element and the terminal do not constitute a limitation on the devices themselves. In an actual implementation, these devices may have other names. Provided that functions of each device are similar to those in the embodiments of this application and fall within the scope of the claims of this application and their equivalent technologies.

These aspects or other aspects in the embodiments of this application are clearer and more comprehensible in descriptions of the following embodiments.

DESCRIPTION OF EMBODIMENTS

In the specification, claims, and accompanying drawings of this application, the terms "first", "second", "third", "fourth", and the like (if existent) are intended to distinguish between similar objects but do not necessarily indicate a specific order or sequence. It should be understood that the data termed in such a way is interchangeable in proper circumstances so that the embodiments of this application described herein can be implemented in an order other than the order illustrated or described herein. Moreover, the terms "include", "comprise" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

The following describes implementations of the embodiments of this application in detail with reference to accompanying drawings.

Figure 1:
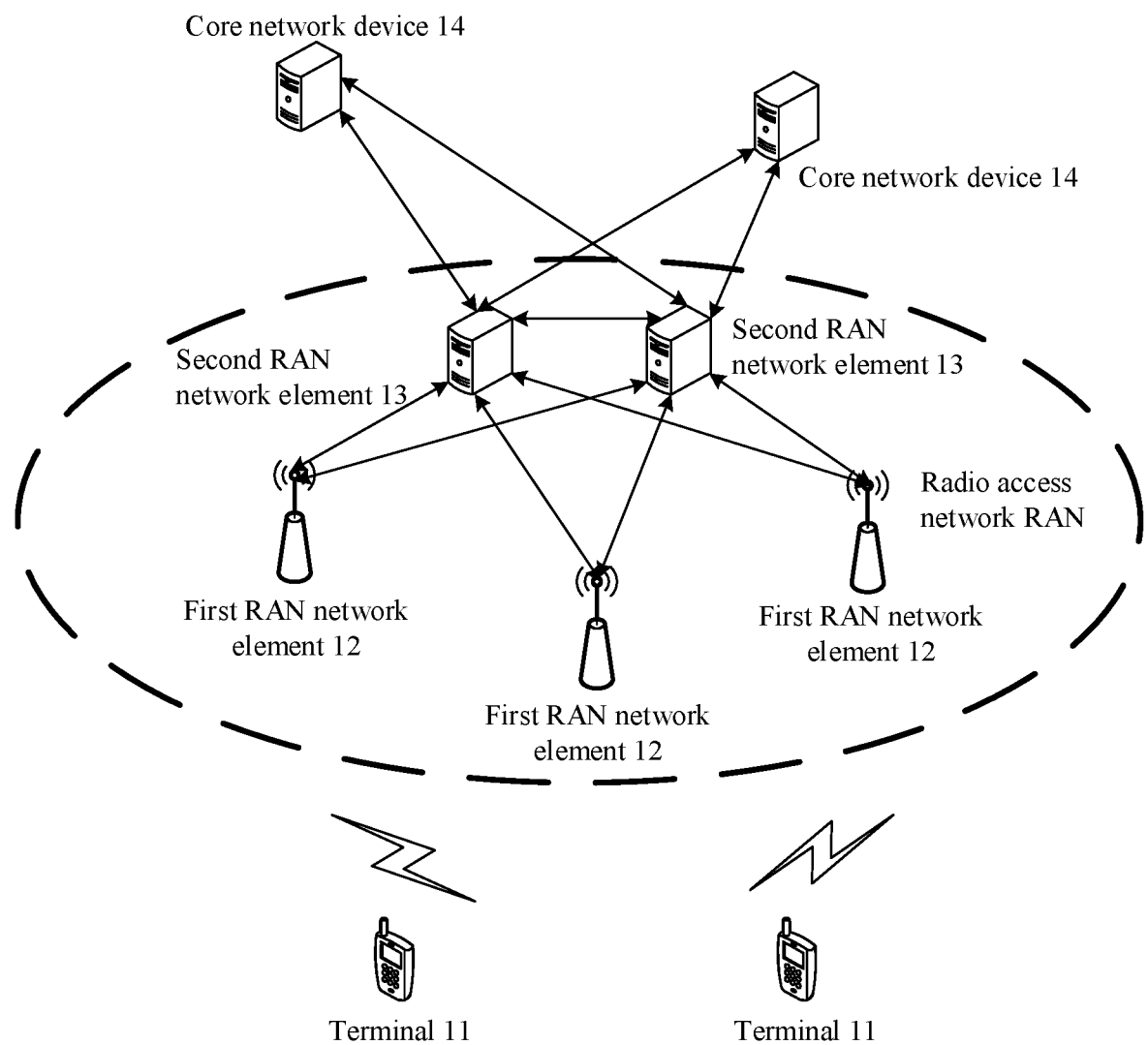
FIG. 1 is an architectural diagram of a system according to an embodiment of this application.

FIG. 1 is a simplified schematic diagram of a system architecture to which an embodiment of this application may be applied. As shown in FIG. 1, the system architecture may include a terminal 11, a first RAN network element 12, a second RAN network element 13, and a core network device 14. As shown in FIG. 1, a radio access network in the figure includes the first RAN network element 12 and the second RAN network element 13, and the RAN in this embodiment of this application may be a CloudRAN.

The terminal 11 is a device (device) that provides voice and/or data connectivity for a user. The terminal 11 may be a handheld device with a wireless connection function, another processing device connected to a wireless modem, or a mobile terminal that communicates with one or more core networks by using the radio access network. For example, the terminal may be a mobile phone (also referred to as a "cellular" phone) and a computer with a mobile terminal. For another example, the terminal 11 may be a portable, pocket-sized, handheld, computer built-in, or vehicle-mounted mobile apparatus. The terminal 11 performs radio communications with the first RAN network element by using a wireless communications technology.

The first RAN network element 12 may be, for example, a radio access network distribution unit (Radio Access Network Distribution Unit, RANDU), configured to schedule, send, and receive radio data. The radio data includes cell broadcast data and user data. The second RAN network element 13 may be, for example, a RAN convergence unit (RAN Convergence Unit, RANCU), configured to manage a context and a bearer of a user, perform mobility control, select a core network, and transmit user data to an S-GW. The RANDU and RANCU are network elements on a cloud access network. The RANDU connects to the RANCU. The RANCU is used to implement a RAN non-real-time (RAN Non Real Time, RAN-NRT) function, and the RANDU is used to implement a RAN real-time (RAN Real Time, RAN-RT) function. It can be learned that the RANCU and the RANDU may be based on division of a real-time function or a non-real-time function. Herein, the RANCU and the RANDU may be further based on other division, for example, division of protocol layers. This is not limited herein. The RANDU is configured to receive data sent by a terminal and send the data to the RANCU. The RANDU is further configured to receive data sent by the RANCU and send the data to the terminal. The RANCU is configured to receive data sent by the RANDU and send the data to a core network device. The RANCU is further configured to receive data sent by the core network device and send the data to the RANDU. In a fourth generation mobile communications technology (4th-generation, 4G), the RANDU and the RANCU may implement a radio access function of an eNB. In a fifth generation mobile communications technology (5th-generation, 5G), the RANDU and the RANCU may implement a radio access function of an access network device in the 5G. This is only an example herein, a used communications system is not limited in this embodiment of this application.

The core network device 14 may be, for example, a mobility management entity (Mobility Management Entity, MME) and/or a serving gateway (Serving GateWay, S-GW) in a 4G communications system. Optionally, the core network device 14 herein may alternatively be a core network device of a 5G communications system and another evolved communications system after the 5G. This is not limited in this application.

Figure 2:
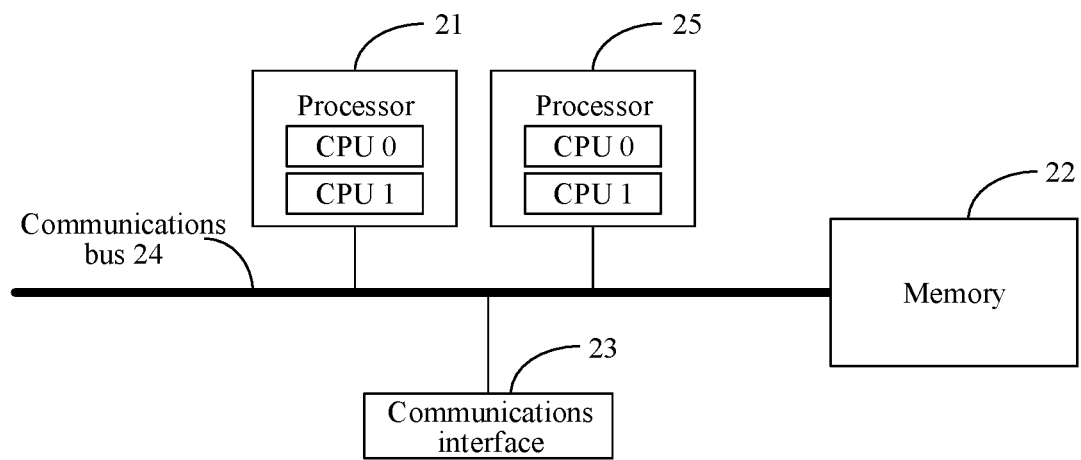
FIG. 2 is a schematic structural diagram of a computer device according to an embodiment of this application.

The first RAN network element 12 and the second RAN network element 13 shown in FIG. 1 may be implemented by using a computer device (or system) in FIG. 2.

FIG. 2 is a schematic structural diagram of a computer device according to an embodiment of this application. As shown in FIG. 2, the computer device may include at least one processor 21, a memory 22, a communications interface 23, and a communications bus 24.

Components of the computer device are specifically described in the following with reference to FIG. 2.

The processor 21 is a control center of the computer device, and may be one processor, or may be a collective name of a plurality of processing components. For example, the processor 21 may be a central processing unit (Central Processing Unit, CPU), or an application-specific integrated circuit (Application Specific Integrated Circuit, ASIC), or one or more integrated circuits configured to implement this embodiment of this application, for example, one or more microprocessors (Digital Signal Processor, DSP) or one or more field programmable gate arrays (Field Programmable Gate Array, FPGA).

The processor 21 may perform various functions of the computer device by running or executing a software program stored in the memory 22, and invoking data stored in the memory 22.

In a specific implementation, in an embodiment, the processor 21 may include one or more CPUs, for example, a CPU 0 and a CPU 1 in FIG. 2.

In a specific implementation, in an embodiment, the computer device may include a plurality of processors, for example, the processor 21 and a processor 25 shown in FIG. 2. Each of these processors may be a single-core processor (single-CPU), or may be a multi-core processor (multi-CPU). The processor herein may be one or more devices, circuits, and/or processing cores used for processing data (such as a computer program instruction).

The memory 22 may be a read-only memory (Read-only Memory, ROM) or another type of static storage device capable of storing static information and instructions, or a random access memory (Random Access Memory, RAM) or another type of dynamic storage device capable of storing information and instructions, or may be an electrically erasable programmable read-only memory (Electrically Erasable Programmable Read-Only Memory, EEPROM), a compact disc read-only memory (Compact Disc Read-Only Memory, CD-ROM), or another compact disc storage or optical disc storage (including a compressed optical disc, a laser disc, an optical disc, a digital versatile disc, a Blu-ray optical disc, and the like), a magnetic disk storage medium or another magnetic storage device, or any other medium capable of including or storing expected program code in a form of instructions or data structures and capable of being accessed by a computer, but is not limited thereto. The memory 22 may exist independently, and is connected to the processor 21 by using the communications bus 24. Alternatively, the memory 22 may be integrated with the processor 21. The memory 22 is configured to store a software program that performs the solution of this application, and the processor 21 controls execution.

The communications interface 23 is any apparatus such as a transceiver, and is configured to communicate with another device or a communications network such as the Ethernet, a radio access network (radio access network, RAN), or a wireless local area network (Wireless Local Area Networks, WLAN). The communications interface 23 may include a receiving unit for performing a receiving function and a sending unit for performing a sending function.

The communications bus 24 may be an industry standard architecture (Industry Standard Architecture, ISA) bus, a peripheral component interconnect (Peripheral Component, PCI) bus, an extended industry standard architecture (Extended Industry Standard Architecture, EISA) bus, or the like. The bus may be classified into an address bus, a data bus, a control bus, and the like. For ease of indication, the bus is indicated by using only one bold line in FIG. 2. However, it does not indicate that there is only one bus or only one type of bus.

The structure of the device shown in FIG. 2 does not constitute a limitation on a computer device. The device may include components more or fewer than those shown in the figure, a combination of some components, or different component arrangements.

Figure 3:
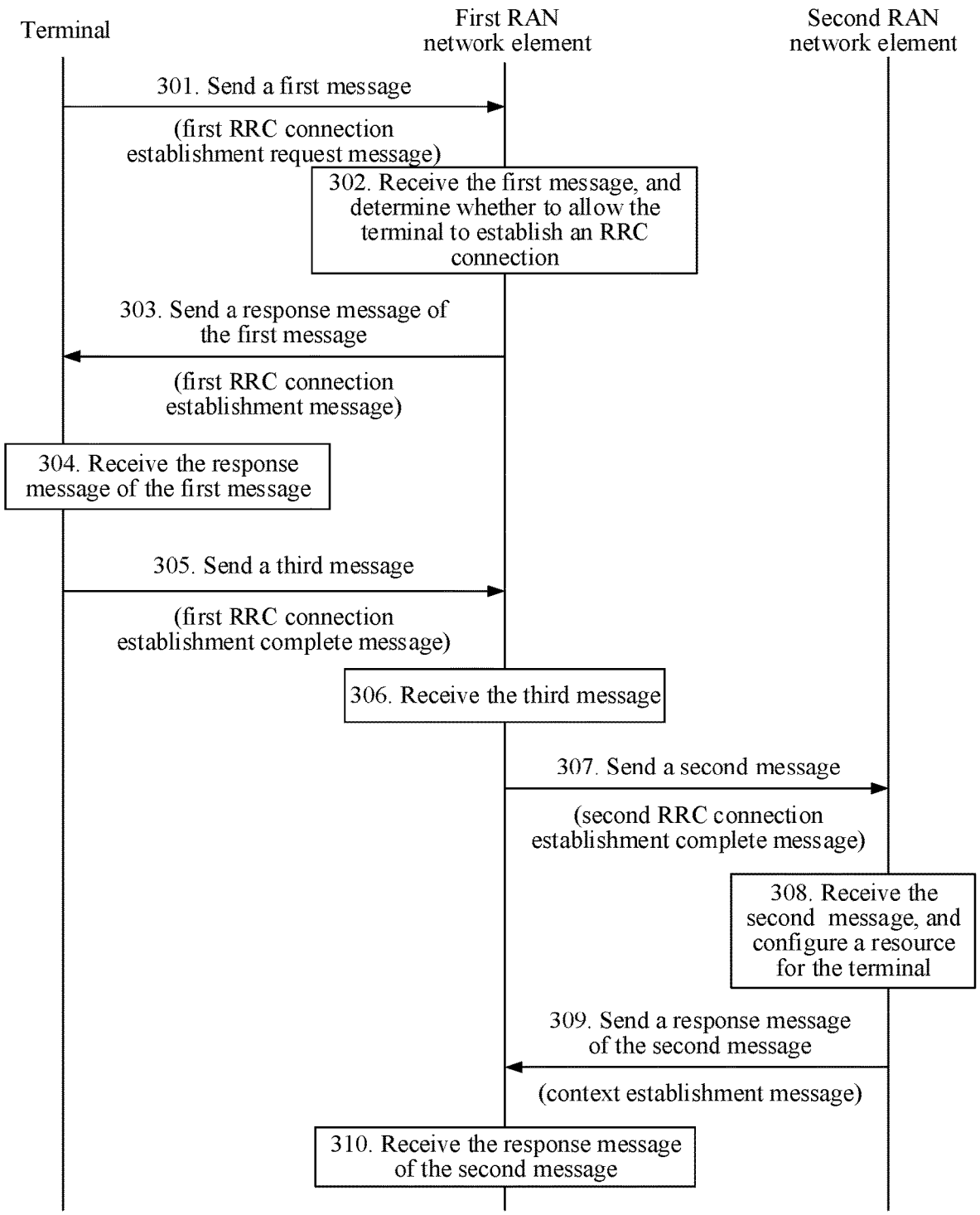
FIG. 3 is a flowchart of a communication method according to an embodiment of this application.

A communication method provided in an embodiment of this application is a method for establishing an RRC connection between a terminal and a RAN. For example, the communication method may be used in the system architecture shown in FIG. 1, and the establishment of the RRC connection includes first RRC connection establishment and second RRC connection establishment. The first RRC connection establishment is a wireless RRC connection between the terminal and a first RAN network element, and the second RRC connection establishment is a wireless or wired RRC connection between the first RAN network element and a second RAN network element. A detailed process is as follows: The RAN includes the first RAN network element and the second RAN network element, the first RAN network element and the second RAN network element are interconnected, and the first RAN network element determines whether to allow the establishment of the RRC connection between the terminal and the RAN, or the first RAN network element and the second RAN network element jointly determine whether to allow the establishment of the RRC connection between the terminal and the RAN, to establish the RRC connection between the terminal and the RAN. FIG. 3 is a flowchart of the communication method according to this embodiment of this application, and the communication method is used in a communications system. The communications system includes the RAN, and the RAN includes the first RAN network element and the second RAN network element, and the first RAN network element and the second RAN network element are interconnected. In addition, the first RAN network element determines whether to allow the establishment of the RRC connection between the terminal and the RAN. As shown in FIG. 3, the method specifically includes the following steps.

301. The terminal sends a first message to the first RAN network element.

When the terminal needs to establish the RRC connection, the terminal first sends the first message to the first RAN network element, and the terminal requests, by using the first message, the establishment of the RRC connection between the terminal and the RAN. For example, the first message includes a terminal identifier (UE identity) and/or a wireless connection establishment cause (establishment cause). Optionally, the first message further includes an evolved universal mobile telecommunications system terrestrial radio access network access cell identity (Evolved Universal Mobile Telecommunications System Terrestrial Radio Access Network Cell Global Identifier, E-UTRAN CGI), and the like. In this case, the first message is a first RRC connection establishment request message.

302. After receiving the first message, the first RAN network element determines, based on the first message, whether to allow the establishment of the RRC connection between the terminal and the RAN.

When the first RAN network element determines not to allow the RRC connection, the first RAN network element rejects the RRC connection establishment request, and ends the process. When the first RAN network element determines to allow the RRC connection, the first RAN network element continues to perform the following steps 303 to 310, as shown in FIG. 3.

303. The first RAN network element sends a response message of the first message to the terminal.

When determining to establish the RRC connection, the first RAN network element sends a second message to a second network element. When the first RAN network element determines to establish the RRC connection between the terminal and the RAN, or after the first RAN network element determines to establish the RRC connection, the first RAN network element sends the response message of the first message to the terminal. A specific time at which the response message of the first message is sent is not limited in this application.

Therefore, the first RAN network element notifies, by using the response message of the first message, the terminal that the establishment of the RRC connection between the terminal and the RAN is determined. For example, the response message of the first message may be a first RRC connection establishment message.

After determining to establish the RRC connection, the first RAN network element configures a radio resource for the establishment of the RRC connection of the terminal. For example, the first RAN network element allocates a cell radio network temporary identifier (Cell Radio Network Temporary Identifier, C-RNTI) to the terminal. The C-RNTI is a dynamic identifier allocated by the first RAN network element to the terminal, and is used to identify a terminal in a cell radio. The C-RNTI is valid only for a terminal in connected mode, in other words, is an identifier of the terminal used when the first RAN network element communicates with the terminal. Further, to establish a communication link between the first RAN network element and the second RAN network element for the terminal, the first RAN network element further allocates a first identifier to the terminal. The first identifier is used to identify the terminal within a range of the first RAN network element. The first identifier may be a RANDU UE VnAP ID. The first identifier RANDU UE VnAP ID herein is only an example, and a name of the identifier is not limited in this embodiment of this application. In addition, the first identifier may alternatively be allocated in another step, and this is only an example herein.

The first RAN network element determines to allow the establishment of the RRC connection between the terminal and the RAN, to perform the following step 304.

304. The terminal receives the response message of the first message sent by the first RAN network element.

305. The terminal sends a third message to the first RAN network element.

After receiving the response message of the first message sent by the first RAN network element, and completing the establishment of the RRC connection, the terminal sends the third message to the first RAN network element, to notify the first RAN network element that the establishment of the RRC connection between the terminal and the RAN is complete. For example, the third message may be a first RRC connection establishment complete message.

306. The first RAN network element receives the third message sent by the terminal.

After receiving the third message sent by the terminal, the first RAN network element learns that the terminal completes the establishment of the RRC connection.

It should be noted that, establishment of a first wireless RRC connection between the terminal and the first RAN network element is complete in steps 301 to 306. Further, to complete the RRC connection between the terminal and the RAN, completing establishment of a wireless or wired second RRC connection between the first RAN network element and the second RAN network element is further required. For example, when determining to establish the RRC connection, the first RAN network element sends the response message of the first message to the terminal. After receiving the third message sent by the terminal, the first RAN network element sends the second message to the second RAN network element. For example, the second message is a second RRC connection establishment complete message. Therefore, when notifying the second RAN network element that the establishment of the RRC connection between the terminal and the first network element is complete, the terminal may request the second RAN network element to configure a resource for the establishment of the RRC connection, and the following detailed steps 307 to 310 are specifically included.

307. The first RAN network element sends the second message to the second RAN network element.

When determining to establish the RRC connection, the first RAN network element sends the second message to the second network element. When determining to establish the RRC connection, the first RAN network element may send the second message to the second network element. Optionally, after determining to establish the RRC connection, the first RAN network element may alternatively send the second message to the second network element. A specific time at which the second message is sent is not limited in this application.

The second message includes the first identifier. It should be noted that the second message further includes the UE identity, and/or the establishment cause, and/or the E-UTRAN CGI, and/or the C-RNTI, and the like.

308. The second RAN network element receives the second message sent by the first RAN network element, and configures the resource for the terminal.

For example, the second message is a second RRC connection establishment complete message shown in FIG. 3, and therefore the second RAN network element learns that the establishment of the RRC connection between the terminal and the first RAN network element is complete.

The second RAN network element configures the resource for the establishment of the RRC connection of the terminal. For example, the second RAN network element allocates configuration parameters, logical channel parameters, physical channel resources, dedicated configuration parameters, and the like of a radio link control layer (Radio Link Control, RLC) protocol and a packet data convergence protocol (Packet Data Convergence Protocol, PDCP) of a signaling bearer (Signalling radio bearer) to the terminal.

It should be noted that the second RAN network element further allocates a second identifier to the terminal. The second identifier is used to identify the terminal within a range of the second RAN network element. The second identifier may be a RANCU UE VnAP ID. The second identifier RANCU UE VnAP ID herein is only an example, and a name of the identifier is not limited in this embodiment of this application. In addition, the second identifier may alternatively be allocated in another step, and this is only an example herein.

309. The second RAN network element sends a response message of the second message to the first RAN network element.

Therefore, the second RAN network element notifies, by using the response message of the second message, the first RAN network element that the second RAN network element completes resource configuration for the establishment of the RRC connection of the terminal. For example, the response message of the second message may be a downlink message in a context establishment process of the terminal, for example, a context establishment message or a downlink non-access stratum (Non-access stratum, NAS) message. The response message of the second message includes a resource parameter configured by the second RAN network element for the terminal, for example, the configuration parameters, the logical channel parameters, the physical channel resources, the dedicated configuration parameters, and the like of an RLC protocol and the PDCP protocol of the signalling radio bearer to the terminal. The response message of the second message includes the first identifier and the second identifier. Therefore, the first RAN network element establishes, based on the first identifier and the second identifier, a link between the first RAN network element and the RAN for the terminal, to establish the RRC connection between the terminal and the RAN.

310. The first RAN network element receives the response message of the second message sent by the second RAN network element.

In the example of this embodiment of this application, a second RRC connection process between the first RAN network element and the second RAN network element, and a first RRC connection establishment process between the terminal and the first RAN network element are sequentially performed according to a time sequence. In other words, the second RRC connection process is started after the first RRC connection establishment process is complete. Optionally, the second RRC connection process and the first RRC connection establishment process in this embodiment of this application may not be performed according to a time sequence. In other words, the second RRC connection process does not need to be started after the first RRC connection establishment process is complete. This is only an example herein, and this is not limited in this application.

It can be learned that the second message including related information (for example, the first identifier) of the radio resource allocated by the first RAN network element to the terminal may further be used to notify the second RAN network element that the establishment of the RRC connection is complete. For example, the second message is the second RRC connection establishment complete message. Therefore, signaling can be saved when the establishment of the RRC connection is complete, and a delay of establishing a link can be effectively reduced.

Figure 4:
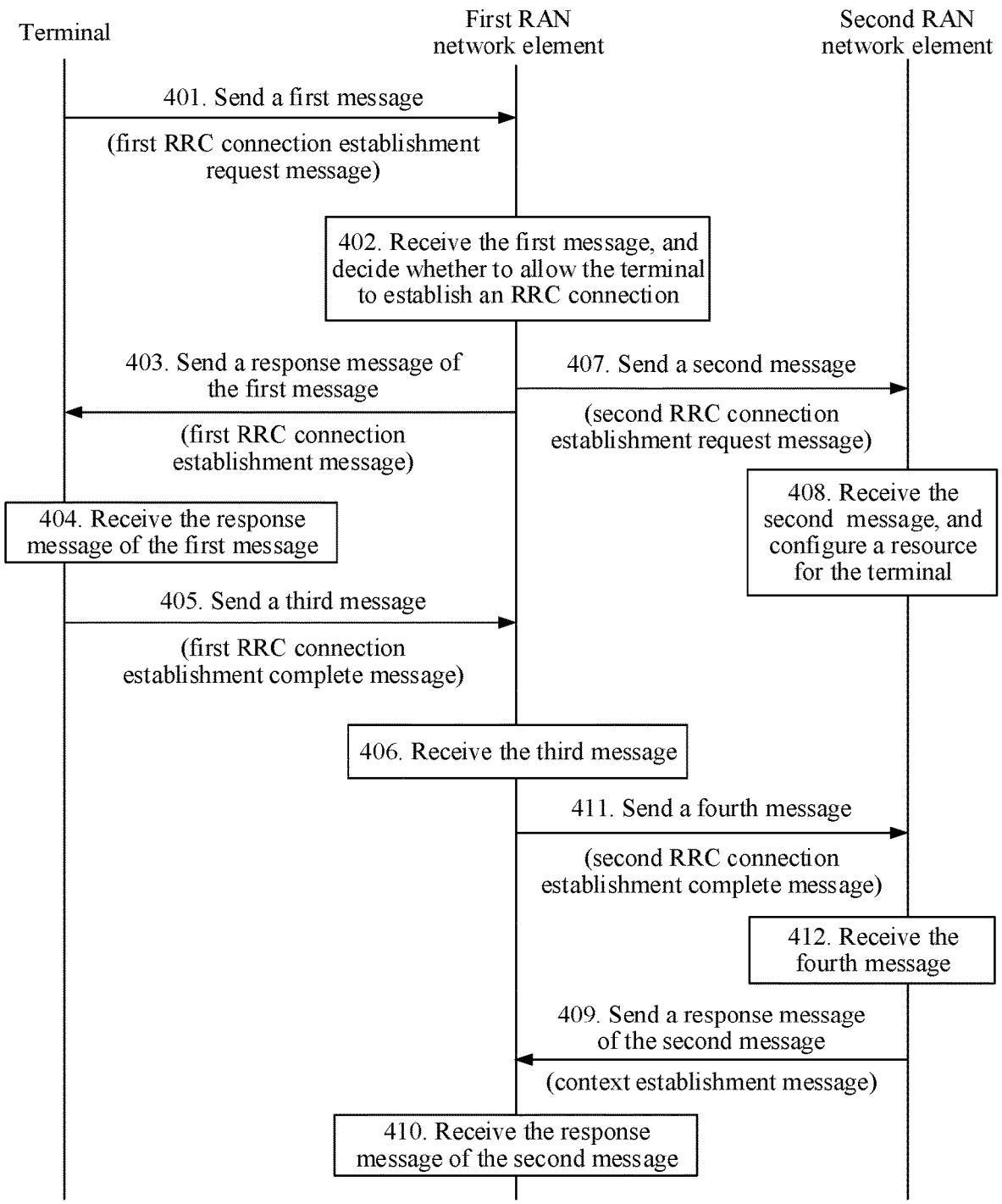
FIG. 4 is a flowchart of another communication method according to an embodiment of this application.

In the foregoing embodiment of this application, the first RAN network element determines whether the terminal can establish the RRC connection, and the first RAN network element identifies that the first identifier of the terminal is sent by the first RAN network element to the second RAN network element in the second RRC connection establishment complete message. Optionally, in another possible implementation in which the first RAN network element determines whether the terminal can establish the RRC connection, the first RAN network element identifies that the first identifier of the terminal may be sent by the first RAN network element to the second RAN network element in a second RRC connection establishment request message. In other words, when the first RAN network element determines to establish the RRC connection, the first RAN network element sends the second message to the second RAN network element, where the second message may be the second RRC connection establishment request message. A specific method process is shown in FIG. 4, and steps 401 to 406 are the same as steps 301 to 306 shown in FIG. 3. Details are not described herein again in the embodiments of this application. A difference between the embodiments shown in FIG. 4 and FIG. 3 is that second messages including related information (for example, a first identifier) of radio resources allocated by the first RAN network elements to the terminals are different. In an embodiment shown in FIG. 4, a second message is a second RRC connection establishment request message, and the second message is a message used by a first RAN network element to request a second RAN network element to configure a resource for establishment of an RRC connection of the terminal. Steps 408 to 410 are the same as steps 308 to 310 shown in FIG. 3, and details are not described herein again in this embodiment of this application. A sequence of steps of a communication method provided in this embodiment of this application may be properly adjusted. As shown in FIG. 4, steps 409 and 410 are performed after step 412. Optionally, steps 409 and 410 may alternatively be performed after step 408 and before step 405. This is not limited herein. In addition, for example, a first RRC connection establishment process between the first RAN network element and the terminal in steps 401 to 406 and a second RRC connection establishment process between the first RAN network element and the second RAN network element in steps 407 to 410 may not be performed according to a time sequence. In other words, the second RRC connection establishment process does not need to be started after the first RRC connection establishment process is complete, and the two processes may be executed at the same time. For example, steps 403 and 407 are performed at the same time. To be specific, the first RAN network element determines to establish the RRC connection, and that the first RAN network element sends a response message of a first message to the terminal and that the first RAN network element sends the second message to the second RAN network element may be performed at the same time. Alternatively, steps 410 and 412 are performed at the same time. This is merely an example for description herein, and this is not limited in this application. Alternatively, the two processes alternate in time. For example, after determining to establish the RRC connection, the first RAN network element first performs step 407. To be specific, the first RAN network element sends the second message to the second RAN network element, and then sends the response message of the first message to the terminal. This is merely an example for description herein, and this is not limited in this application.

Optionally, after the first RAN network element receives a third message sent by the terminal, in other words, after receiving a message used by the terminal to notify the first RAN network element that the establishment of the RRC connection between the terminal and the RAN is complete, the first RAN network element needs to notify the second RAN network element that the establishment of the RRC connection between the terminal and the RAN is complete. For example, after step 406 and before step 410 in this embodiment of this application, steps 411 and 412 may further be performed. Steps 411 and 412 are performed to notify the second RAN network element that the establishment of the RRC connection is complete, and this is specifically as follows.

411. The first RAN network element sends a fourth message to the second RAN network element.

After receiving the third message sent by the terminal, the first RAN network element sends the fourth message to the second RAN network element, to notify the second RAN network element that the establishment of the RRC connection is complete. For example, the fourth message may be a second RRC connection establishment complete message.

412. The second RAN network element receives the fourth message sent by the first RAN network element.

Therefore, after receiving the fourth message, the second RAN network element learns that the establishment of the RRC connection between the terminal and the RAN is complete.

In this embodiment of this application, a second identifier is sent to the first RAN network element by using a response message of the second message. Optionally, the second identifier may alternatively be fed back in a new piece of feedback information to the first RAN network element after the second RAN network element receives the second message sent by the first RAN network element in step 408 and before step 409. This is merely an example herein, and a carrier of the second identifier is not limited in this embodiment.

It can be learned that in this embodiment of this application, the second message including related information (including the first identifier) of a radio resource allocated by the first RAN network element to the terminal may be the second RRC connection establishment request message. In addition, the first RRC connection establishment process between the first RAN network element and the terminal and the second RRC connection establishment process between the first RAN network element and the second RAN network element are performed simultaneously or alternately, so that a delay of connection establishment is effectively reduced when the establishment of the RRC connection is complete between the terminal and the RAN.

Figure 5:
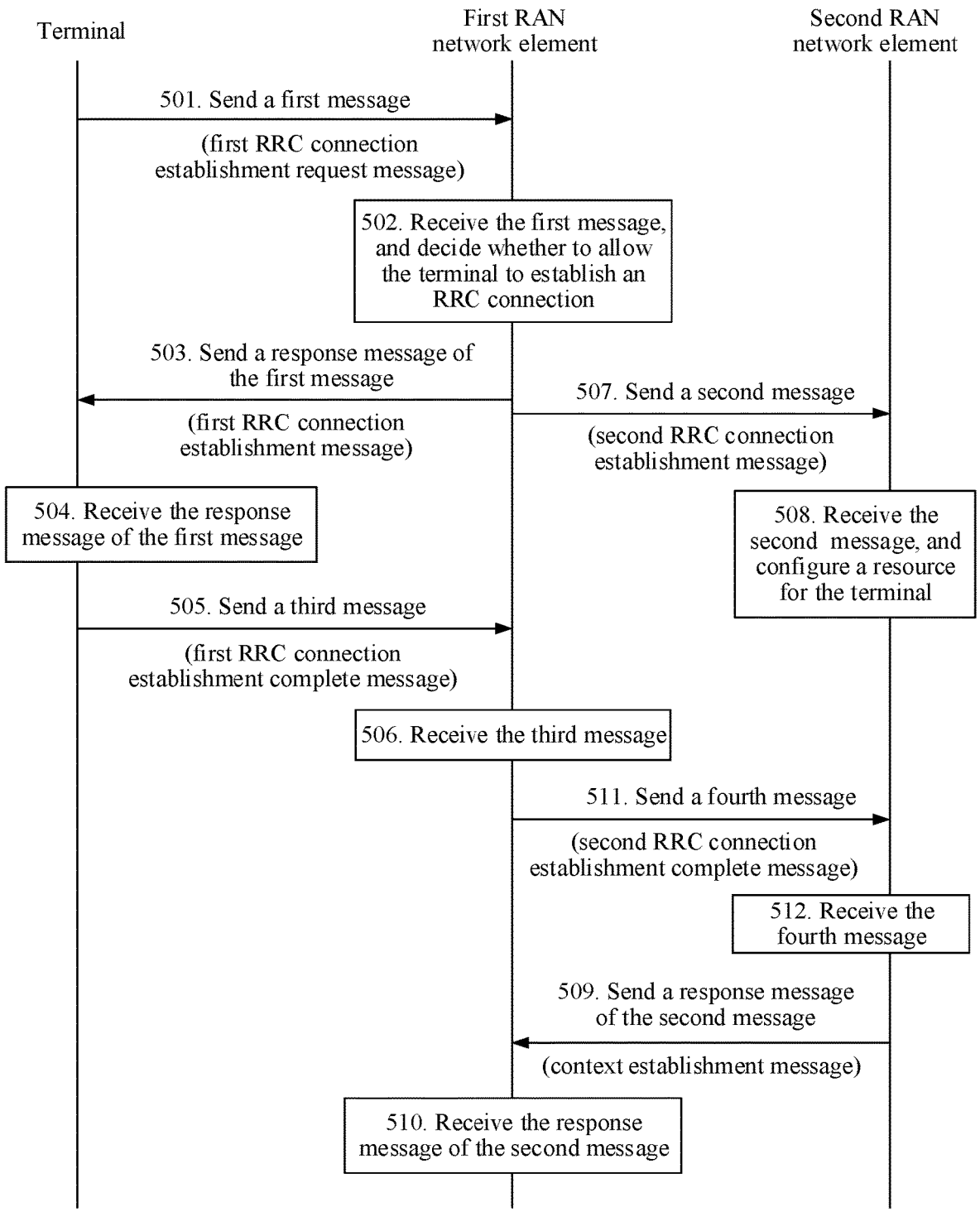
FIG. 5 is a flowchart of another communication method according to an embodiment of this application.

That the first RAN network element identifies the first identifier of the terminal may be performed not only in the second RRC connection establishment request message, and optionally, but also in a second RRC connection establishment message. In other words, the second message may further be the second RRC connection establishment message. Referring to FIG. 5, specifically, steps 501 to 512 are the same as steps 401 to 412, and beneficial effects are the same as those in the embodiment shown in FIG. 4, and details are not described herein again.

Figure 6:
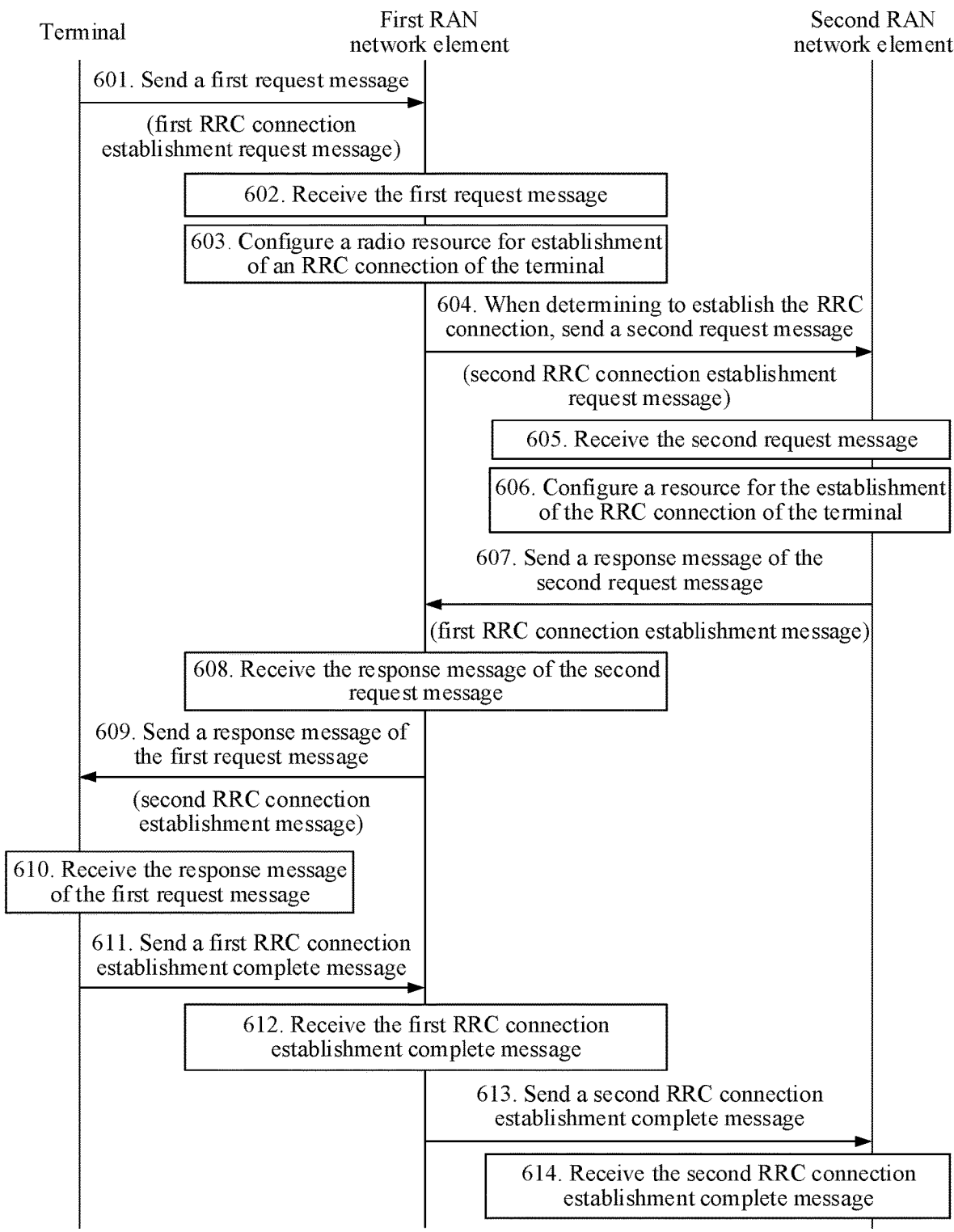
FIG. 6 is a flowchart of another communication method according to an embodiment of this application.

In the communication method provided in the foregoing embodiment, the first RAN network element determines whether the terminal can establish the RRC connection with the RAN. In another possible implementation, whether the terminal can establish the RRC connection with the RAN may alternatively be jointly determined by the first RAN network element and the second RAN network element. Based on the radio access network architecture shown in FIG. 1, FIG. 6 is a flowchart of a communication method according to an embodiment of this application, and the communication method is used in a communications system. The communications system includes a RAN, and the RAN includes a first RAN network element and a second RAN network element, and the first RAN network element and the second RAN network element are interconnected. In addition, the first RAN network element and the second RAN network element jointly determine whether to allow establishment of an RRC connection between a terminal and the RAN. As shown in FIG. 6, the method specifically includes the following steps.

601. The terminal sends a first request message to the first RAN network element.

When the terminal needs to establish the RRC connection with the RAN, the terminal sends the first request message to the first RAN network element, and the terminal requests, by using the first request message, the first RAN network element to establish the RRC connection between the terminal and the RAN. For example, the first request message includes a UE identity, and/or an establishment cause, and/or an E-UTRAN CGI, and the like. For example, the first request message may be a first RRC connection establishment request message.

602. The first RAN network element receives the first request message sent by the terminal.

603. The first RAN network element determines to establish the RRC connection based on the first request message, and configures a radio resource for the establishment of the RRC connection of the terminal.

After receiving the first request message sent by the terminal, the first RAN network element determines to allow the establishment of the RRC connection between the terminal and the RAN, and the first RAN network element configures the radio resource for the establishment of the RRC connection of the terminal. For example, the first RAN network element allocates a C-RNTI to the terminal. The C-RNTI is a dynamic identifier allocated by the first RAN network element to the terminal, and is used to identify a terminal in a cell radio. The C-RNTI is valid only for a terminal in connected mode, in other words, is an identifier of the terminal used when the first RAN network element communicates with the terminal.

Further, the first RAN network element may further allocate a first identifier to the terminal. The first identifier is used to identify the terminal within a range of the first RAN network element. The first identifier may be a RANDU UE VnAP ID. The first identifier RANDU UE VnAP ID herein is only an example, and a name of the identifier is not limited in this embodiment of this application.

604. When determining to establish the RRC connection based on the first request message, the first RAN network element sends a second request message to the second RAN network element.

Therefore, the first RAN network element notifies, by using the second request message, the second RAN network element that the terminal requests the establishment of the RRC connection to the RAN. The second request message includes the first identifier. It should be noted that the second request message further includes the UE identity, and/or the establishment cause, and/or the E-UTRAN CGI, and/or the C-RNTI. For example, the second request message may be a second RRC connection establishment request message.

605. The second RAN network element receives the second request message sent by the first RAN network element.

606. The second RAN network element determines to establish the RRC connection based on the second request message, and configures a radio resource for the establishment of the RRC connection of the terminal.

After receiving the second request message, the second RAN network element determines to allow the establishment of the RRC connection between the terminal and the RAN, and the second RAN network element configures the radio resource for the establishment of the RRC connection of the terminal. For example, the second RAN network element allocates configuration parameters, and/or logical channel parameters, and/or physical channel resources, dedicated configuration parameters, and the like of an RLC protocol and a PDCP protocol of a signalling radio bearer to the terminal.

It should be noted that the second RAN network element may further allocate a second identifier to the terminal. The second identifier is used to identify the terminal within a range of the second RAN network element. The second identifier may be a RANCU UE VnAP ID. The second identifier RANCU UE VnAP ID herein is only an example, and a name of the identifier is not limited in this embodiment of this application.

607. The second RAN network element sends a response message of the second request message to the first RAN network element.

The second RAN network element notifies, by using the response message of the second request message, the first RAN network element that the second RAN network element determines to establish the RRC connection between the terminal and the RAN. The response message of the second request message includes the first identifier and the second identifier. Therefore, the first RAN network element establishes, based on the first identifier and the second identifier, a link between the first RAN network element and the second RAN network element for the terminal, to implement an RRC connection process between the terminal and the RAN. The response message of the second request message further includes the configuration parameters, and/or the logical channel parameters, and/or the physical channel resources, and/or the dedicated configuration parameters, and the like of the RLC and the PDCP of the signaling bearer (Signalling radio bearer) allocated by the second RAN network element to the terminal. In this case, the response message of the second request message may be a first RRC connection establishment message.

608. The first RAN network element receives the response message of the second request message sent by the second RAN network element.

The first RAN network element may generate a response message of the first request message based on the response message of the second request message.

609. The first RAN network element sends the response message of the first request message to the terminal based on the response message of the second request message.

The first RAN network element notifies, by using the response message of the first request message, the terminal that the first RAN network element determines to establish the RRC connection between the terminal and the RAN. For example, the response message of the first request message may be a second RRC connection establishment message.

610. The terminal receives the response message of the first request message sent by the first RAN network element.

611. The terminal sends a first RRC connection establishment complete message to the first RAN network element.

The terminal notifies, by using the first RRC connection establishment complete message, the first RAN network element that the establishment of the RRC connection between the terminal and the RAN is complete.

612. The first RAN network element receives the first RRC connection establishment complete message sent by the terminal.

After receiving the message, the first RAN network element confirms, by using the message, that the establishment of the RRC connection is complete.

613. The first RAN network element sends a second RRC connection establishment complete message to the second RAN network element.

The first RAN network element notifies, by using the second RRC connection establishment complete message, the second RAN network element that the establishment of the RRC connection between the terminal and the RAN is complete.

614. The second RAN network element receives the second RRC connection establishment complete message sent by the first RAN network element.

After receiving the message, the second RAN network element learns that RRC establishment is complete.

According to the communication method provided in this embodiment of this application, in a scenario in which the communications system includes the RAN, the RAN includes the first RAN network element and the second RAN network element, and the first RAN network element and the second RAN network element are interconnected, the first RAN network element and the second RAN network element jointly determine whether to allow the establishment of the RRC connection between the terminal and the RAN, to establish the RRC connection between the terminal and the RAN.

The foregoing mainly describes the solutions provided in the embodiments of this application from the perspective of interaction between network elements. It may be understood that, to implement the foregoing functions, each network element such as the first RAN network element and the second RAN network element include corresponding hardware structures and/or software modules for implementing each function. A person skilled in the art should be easily aware that the algorithm steps in the examples described with reference to the embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In an embodiment of this application, a first RAN network element and a second RAN network element may be divided into functional modules based on the foregoing method examples. For example, each functional module may be obtained through division based on corresponding functions, or two or more functions may be integrated into one processing module. The integrated module may be implemented in a form of hardware, or may be implemented in a form of a software functional module. It should be noted that, in this embodiment of this application, module division is an example, and is merely a logical function division. In a specific implementation, another division manner may be used.

Figure 7:
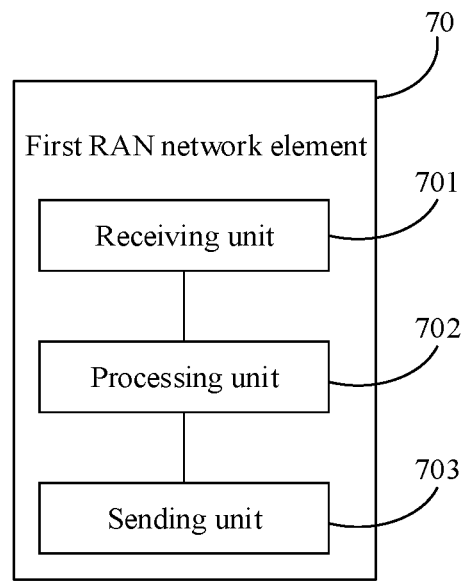
FIG. 7 is a schematic structural diagram of a first RAN network element according to an embodiment of this application.

When each functional module is obtained through division for each corresponding function, FIG. 7 is a possible schematic composition diagram of the first RAN network element in the foregoing embodiments. As shown in FIG. 7, a first RAN network element 70 may include a receiving unit 701, a processing unit 702, and a sending unit 703.

The receiving unit 701 is configured to support the first RAN network element to perform steps 302, 306, and 310 in the communication method shown in FIG. 3, steps 402, 406, and 410 in the communication method shown in FIG. 4, steps 502, 506, and 510 in the communication method shown in FIG. 5, and steps 602, 608, and 612 in the communication method shown in FIG. 6.

The processing unit 702 is configured to support the first RAN network element to perform step 302 in the communication method shown in FIG. 3, step 402 in the communication method shown in FIG. 4, step 502 in the communication method shown in FIG. 5, and step 603 in the communication method shown in FIG. 6.

The sending unit 703 is configured to support the first RAN network element to perform steps 303 and 307 in the communication method shown in FIG. 3, steps 403, 407, and 411 in the communication method shown in FIG. 4, and steps 503, 507, and 511 in the communication method shown in FIG. 5, and steps 604 and 613 in the communication method shown in FIG. 6.

It should be noted that all related content of the steps in the method embodiments can be incorporated into descriptions of functions of the corresponding functional modules by reference. Details are not described herein again.

A first RAN network element provided in an embodiment of this application is configured to perform the foregoing communication method, and therefore an effect that is the same as that of the foregoing communication method can be achieved.

Figure 8:
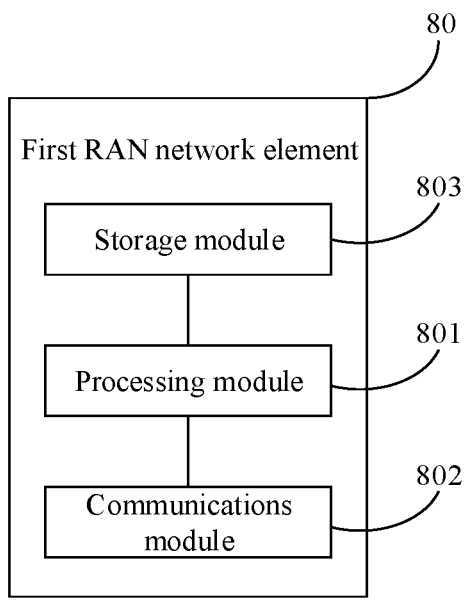
FIG. 8 is a schematic structural diagram of another first RAN network element according to an embodiment of this application.

When an integrated unit is used, FIG. 8 is another possible schematic composition diagram of the first RAN network element in the foregoing embodiments. As shown in FIG. 8, a first RAN network element 80 includes a processing module 801 and a communications module 802.

The processing module 801 is configured to control and manage an action of the first RAN network element. For example, the processing module 801 is configured to support the first RAN network element to perform step 302 in the communication method shown in FIG. 3, step 402 in the communication method shown in FIG. 4, step 502 in the communication method shown in FIG. 5, and step 603 in the communication method shown in FIG. 6 and/or other processes of the technologies described in this specification. The communications module 802 is configured to support communication between the first RAN network element and another network entity. The first RAN network element may further include a storage module 803, configured to store program code and data of the first RAN network element.

The processing module 801 may be a processor or a controller. The processing module 801 may implement or execute various example logic blocks, modules, and circuits described with reference to content disclosed in this application. Alternatively, the processor may be a combination of processors implementing a computing function, for example, a combination of one or more microprocessors, or a combination of a DSP and a microprocessor, or the like. The communications module 802 may be a transceiver, a transceiver circuit, a communications interface, or the like. The storage module 803 may be a memory.

When the processing module 801 is a processor, the communications module 802 is a communications interface, and the storage module 803 is a memory, the first RAN network element in this embodiment of this application may be the computer device shown in FIG. 2.

Figure 9:
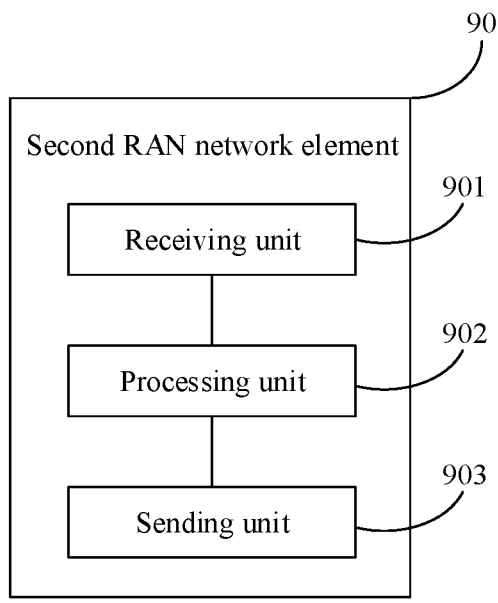
FIG. 9 is a schematic structural diagram of a second RAN network element according to an embodiment of this application.

When each functional module is obtained through division for each corresponding function, FIG. 9 is a possible schematic composition diagram of a second RAN network element in the foregoing embodiments. As shown in FIG. 9, a second RAN network element 90 may include a receiving unit 901, a processing unit 902, and a sending unit 903.

The receiving unit 901 is configured to support the second RAN network element to perform step 308 in the communication method shown in FIG. 3, steps 408 and 412 in the communication method shown in FIG. 4, steps 508 and 512 in the communication method shown in FIG. 5, and steps 605 and 614 in the communication method shown in FIG. 6.

The processing unit 902 is configured to support the second RAN network element to perform step 606 in the communication method shown in FIG. 6.

The sending unit 903 is configured to support the second RAN network element to perform step 309 in the communication method shown in FIG. 3, step 409 in the communication method shown in FIG. 4, step 509 in the communication method shown in FIG. 5, and step 607 in the communication method shown in FIG. 6.

It should be noted that all related content of the steps in the method embodiments can be incorporated into descriptions of functions of the corresponding functional modules by reference. Details are not described herein again.

A second RAN network element provided in an embodiment of this application is configured to perform the foregoing communication method, and therefore, an effect that is the same as that of the foregoing communication method can be achieved.

Figure 10:
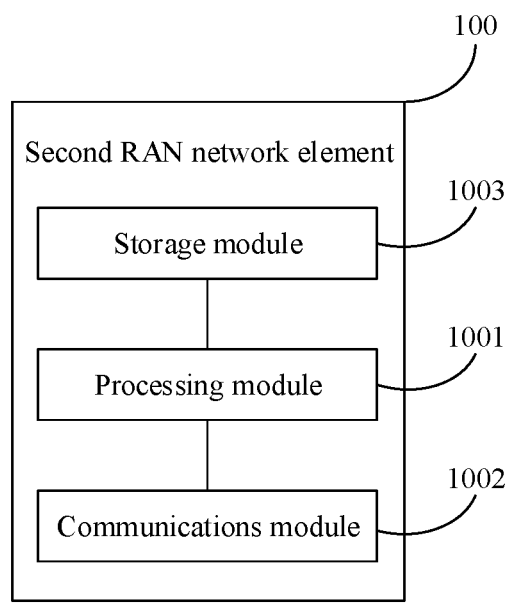
FIG. 10 is a schematic structural diagram of another second RAN network element according to an embodiment of this application.

When an integrated unit is used, FIG. 10 is another possible schematic composition diagram of the second RAN network element in the foregoing embodiments. As shown in FIG. 10, a second RAN network element 100 includes a processing module 1001 and a communications module 1002.

The processing module 1001 is configured to control and manage an action of the second RAN network element. The communications module 1002 is configured to support communication between the second RAN network element and another network entity. The second RAN network element may further include a storage module 1003, configured to store program code and data of the second RAN network element.

The processing module 1001 may be a processor or a controller. The processing module 1001 may implement or execute various example logic blocks, modules, and circuits described with reference to content disclosed in this application. Alternatively, the processor may be a combination of processors implementing a computing function, for example, a combination of one or more microprocessors, or a combination of a DSP and a microprocessor, or the like. The communications module 1002 may be a transceiver, a transceiver circuit, a communications interface, or the like. The storage module 1003 may be a memory.

When the processing module 1001 is a processor, the communications module 1002 is a communications interface, and the storage module 1003 is a memory, the second RAN network element in this embodiment of this application may be the computer device shown in FIG. 2.

The foregoing descriptions about implementations allow a person skilled in the art to understand that, for the purpose of convenient and brief description, division of the foregoing functional modules is used as an example for illustration. In actual application, the foregoing functions may be allocated to different functional modules and implemented as required, in other words, an inner structure of an apparatus is divided into different functional modules to implement all or some of the functions described above.

In the several embodiments provided in this application, it should be understood that the disclosed apparatus and method may be implemented in other manners. For example, the described apparatus embodiments are merely examples. For example, the module or unit division is merely logical function division and may be other division during a specific implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may be one or more physical units, in other words, may be located in one place, or may be distributed on a plurality of different places. Some or all of the units may be selected according to actual requirements to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions in the embodiments of this application essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communication method, used in a communications system, wherein the communications system comprises a radio access network (RAN), the RAN comprises a first RAN network element and a second RAN network element, the first RAN network element and the second RAN network element are interconnected, and the method comprises:
   receiving, by the first RAN network element, a first message from a terminal, wherein the first message comprises a request to establish a radio resource control (RRC) connection between the terminal and the RAN;
   determining, by the first RAN network element based on the first message, to establish the RRC connection, and sending a response message of the first message to the terminal, wherein the response message of the first message comprises a notification to the terminal that establishment of the RRC connection between the terminal and the RAN is determined;
   sending, by the first RAN network element, a second message to the second RAN network element, wherein the second message comprises a request to the second RAN network element to configure a resource for the establishment of the RRC connection of the terminal; and
   receiving, by the first RAN network element, a response message of the second message from the second RAN network element, wherein the response message of the second message comprises a resource parameter configured by the second RAN network element for the terminal, wherein the response message of the second message comprises a first identifier and a second identifier, the first identifier is allocated by the first RAN network element and identifies the terminal within a range of the first RAN network element, and the second identifier is allocated by the second RAN network element and identifies the terminal within a range of the second RAN network element.

2. The method according to claim 1, wherein after the sending, by the first RAN network element, a response message of the first message to the terminal, the method further comprises:
   receiving, by the first RAN network element, a third message sent by the terminal, wherein the third message comprises a notification to the first RAN network element that the establishment of the RRC connection is complete.

3. The method according to claim 2, wherein after the receiving, by the first RAN network element, a third message sent by the terminal, the method further comprises:
   sending, by the first RAN network element, a fourth message to the second RAN network element, wherein the fourth message comprises a notification to the second RAN network element that the establishment of the RRC connection is complete.

4. The method according to claim 1, wherein the second message further comprises a notification to the second RAN network element that the establishment of the RRC connection is complete.

5. A communication method, used in a communications system, wherein the communications system comprises a radio access network (RAN), the RAN comprises a first RAN network element and a second RAN network element, the first RAN network element and the second RAN network element are interconnected, and the method comprises:
   receiving, by the second RAN network element, a second message from the first RAN network element, wherein the second message comprises a request to the second RAN network element to configure a resource for establishment of a radio resource control (RRC) connection of a terminal, a first message is a message that is received from the terminal before the first RAN network element sends the second message to the second RAN network element, and the first message comprises a request to establish the RRC connection between the terminal and the RAN; and
   sending, by the second RAN network element, a response message of the second message to the first RAN network element, wherein the response message of the second message comprises a resource parameter configured by the second RAN network element for the terminal, wherein the response message of the second message comprises a first identifier and a second identifier, the first identifier is allocated by the first RAN network element and identifies the terminal within a range of the first RAN network element, and the second identifier is allocated by the second RAN network element and identifies the terminal within a range of the second RAN network element.

6. The method according to claim 5, wherein the second message further comprises a notification to the second RAN network element that the establishment of the RRC connection is complete.

7. The method according to claim 5, wherein the method further comprises:
   receiving, by the second RAN network element, a fourth message from the first RAN network element, wherein the fourth message comprises a notification to the second RAN network element that the establishment of the RRC connection is complete, a third message is a message that is received by the first RAN network element from the terminal before the first RAN network element sends the fourth message to the second RAN network element, and the third message comprises a notification to the first RAN network element that the establishment of the RRC connection is complete.

8. A communication method, used in a communications system, wherein the communications system comprises a radio access network (RAN), the RAN comprises a first RAN network element and a second RAN network element, the first RAN network element and the second RAN network element are interconnected, and the method comprises:
receiving, by the first RAN network element, a first request message from a terminal, wherein the first request message comprises a request to establish of a radio resource control (RRC) connection between the terminal and the RAN;
configuring, by the first RAN network element, a radio resource for establishment of the RRC connection of the terminal;
sending, by the first RAN network element, a second request message to the second RAN network element, wherein the second request message comprises a notification to the second RAN network element that the terminal requests the establishment of the RRC connection to the RAN;
receiving, by the first RAN network element, a response message of the second request message from the second RAN network element, wherein the response message of the second request message is a message that is sent to the first RAN network element when the second RAN network element determines, based on the second request message, to establish the RRC connection, and the response message of the second request message comprises a notification to the first RAN network element to determine to establish the RRC connection between the terminal and the RAN;
sending, by the first RAN network element based on the response message of the second request message, a response message of the first request message to the terminal, wherein the response message of the first request message comprises a notification to the terminal that the establishment of the RRC connection between the terminal and the RAN is determined; and
receiving, by the first RAN network element, a first RRC connection establishment complete message sent by the terminal, wherein the first RRC connection establishment complete message comprises a notification to the first RAN network element that the establishment of the RRC connection is complete.

9. The method according to claim 8, wherein the second request message comprises a first identifier, and the first identifier is allocated by the first RAN network element and identifies the terminal within a range of the first RAN network element.

10. The method according to claim 8, wherein the response message of the second request message comprises a first identifier and a second identifier, the first identifier is allocated by the first RAN network element and identifies the terminal within a range of the first RAN network element, and the second identifier is allocated by the second RAN network element and identifies the terminal within a range of the second RAN network element.

11. The method according to claim 8, wherein after the receiving, by the first RAN network element, a first RRC connection establishment complete message sent by the terminal, the method further comprises:
sending, by the first RAN network element, a second RRC connection establishment complete message to the second RAN network element, wherein the second RRC connection establishment complete message comprises a notification to the second RAN network element that the establishment of the RRC connection is complete.

12. A communication method, used in a communications system, wherein the communications system comprises a radio access network (RAN), the RAN comprises a first RAN network element and a second RAN network element, the first RAN network element and the second RAN network element are interconnected, and the method comprises:
receiving, by the second RAN network element, a second request message from the first RAN network element, wherein the second request message comprises a notification to the second RAN network element that a terminal requests establishment of a radio resource control (RRC) connection to the RAN;
determining, by the second RAN network element based on the second request message, to establish the RRC connection, wherein the second RAN network element configures a resource for the establishment the RRC connection of the terminal; and
sending, by the second RAN network element, a response message of the second request message to the first RAN network element, wherein the response message of the second request message comprises a notification to the first RAN network element to determine to establish the RRC connection between the terminal and the RAN, wherein the response message of the second request message comprises a first identifier and a second identifier, the first identifier is allocated by the first RAN network element and identifies the terminal within a range of the first RAN network element, and the second identifier is allocated by the second RAN network element and identifies the terminal within a range of the second RAN network element.

13. The method according to claim 12, wherein after the sending, by the second RAN network element, a response message of the second request message to the first RAN network element, the method further comprises:
receiving, by the second RAN network element, a second connection establishment complete message from the first RAN network element, a first RRC connection establishment complete message is a message that is received from the terminal before the first RAN network element sends the second connection establishment complete message to the second RAN network element, the first RRC connection establishment complete message comprises a notification to the first RAN network element that the establishment of the RRC connection is complete, and a second RRC connection establishment complete message comprises a notification to the second RAN network element that the establishment of the RRC connection is complete.

14. A first radio access network (RAN) network element, wherein a communications system comprises a RAN, the RAN comprises the first RAN network element and a second RAN network element, the first RAN network element and the second RAN network element are interconnected, and the first RAN network element comprises at least one processor and a memory coupled to the at least one processor, the at least one processor being configured to:

receive, a first message from a terminal, wherein the first message comprises a request to establish a radio resource control (RRC) connection between the terminal and the RAN;

determine, based on the first message, to establish the RRC connection, and send a response message of the first message to the terminal, wherein the response message of the first message comprises a notification to the terminal that establishment of the RRC connection between the terminal and the RAN is determined;

send, a second message to the second RAN network element, wherein the second message comprises a request to the second RAN network element to configure a resource for the establishment of the RRC connection of the terminal; and receive, a response message of the second message from the second RAN network element, wherein the response message of the second message comprises a resource parameter configured by the second RAN network element for the terminal, wherein the response message of the second message comprises a first identifier and a second identifier, the first identifier is allocated by the first RAN network element and identifies the terminal within a range of the first RAN network element, and the second identifier is allocated by the second RAN network element and identifies the terminal within a range of the second RAN network element.

15. The first RAN network element according to claim 14, wherein after the sending a response message of the first message to the terminal, the at least one processor being further configured to:

receive a third message sent by the terminal, wherein the third message comprises a notification to the first RAN network element that the establishment of the RRC connection is complete.

16. The first RAN network element according to claim 15, wherein after the receiving third message sent by the terminal, the at least one processor being further configured to:

send a fourth message to the second RAN network element, wherein the fourth message comprises a notification to the second RAN network element that the establishment of the RRC connection is complete.

17. The first RAN network element according to claim 14, wherein the second message further comprises a notification to the second RAN network element that the establishment of the RRC connection is complete.

18. A second radio access network (RAN) network element, wherein a communications system comprises a RAN, the RAN comprises a first RAN network element and the second RAN network element, the first RAN network element and the second RAN network element are interconnected, and the second RAN network element comprises at least one processor and a memory coupled to the at least one processor, the at least one processor being configured to:

receive a second message from the first RAN network element, wherein the second message comprises a request to the second RAN network element to configure a resource for establishment of a radio resource control (RRC) connection of a terminal; and send a response message of the second message to the first RAN network element, wherein the response message of the second message comprises a resource parameter configured by the second RAN network element for the terminal, wherein the response message of the second message comprises a first identifier and a second identifier, the first identifier is allocated by the first RAN network element and identifies the terminal within a range of the first RAN network element, and the second identifier is allocated by the second RAN network element and identifies the terminal within a range of the second RAN network element.

19. The second RAN network element according to claim 18, wherein the second message further comprises a notification to the second RAN network element that the establishment of the RRC connection is complete.

20. The second RAN network element according to claim 18, wherein the at least one processor being further configured to:

receive a fourth message from the first RAN network element, wherein the fourth message comprises a notification to the second RAN network element that the establishment of the RRC connection is complete, a third message is a message that is received by the first RAN network element from the terminal before the first RAN network element sends the fourth message to the second RAN network element, and the third message comprises a notification to the first RAN network element that the establishment of the RRC connection is complete.

21. A first radio access network (RAN) network element, wherein a communications system comprises a RAN, the RAN comprises the first RAN network element and a second RAN network element, the first RAN network element and the second RAN network element are interconnected, and the first RAN network element comprises at least one processor and a memory coupled to the at least one processor, the at least one processor being configured to:

receive a first request message from a terminal, wherein the first request message comprises a request to establish a radio resource control (RRC) connection between the terminal and the RAN;

configure a resource for establishment of the RRC connection of the terminal; and send a second request message to the second RAN network element, wherein the second request message comprises a notification to the second RAN network element that the terminal requests the establishment of the RRC connection to the RAN, wherein the at least one processor being further configured to:

receive, a response message of the second request message from the second RAN network element, wherein the response message of the second request message comprises a notification to the first RAN network element to determine to establish the RRC connection between the terminal and the RAN;

send, based on the response message of the second request message, a response message of a first request message to the terminal, wherein the response message of the first request message comprises a notification to the terminal that the establishment of the RRC connection between the terminal and the RAN is determined; and receive, a first RRC connection establishment complete message sent by the terminal.

22. The first RAN network element according to claim 21, wherein the second request message comprises a first identifier, and the first identifier is allocated by the first RAN network element and identifies the terminal within a range of the first RAN network element.

23. The first RAN network element according to claim 21, wherein the response message of the second request message comprises a first identifier and a second identifier, the first identifier is allocated by the first RAN network element and identifies the terminal within a range of the first RAN network element, and the second identifier is allocated by the second RAN network element and identifies the terminal within a range of the second RAN network element.

24. The first RAN network element according to claim 21, wherein the at least one processor being further configured to:

send, a second RRC connection establishment complete message to the second RAN network element, wherein the second RRC connection establishment complete message comprises a notification to the second RAN network element that the establishment of the RRC connection is complete.

25. A second radio access network (RAN) network element, wherein a communications system comprises a RAN, the RAN comprises a first RAN network element and the second RAN network element, the first RAN network element and the second RAN network element are interconnected, and the second RAN network element comprises at least one processor and a memory coupled to the at least one processor, the at least one processor being configured to:

receive, a second request message from the first RAN network element, wherein the second request message comprises a notification to the second RAN network element that a terminal requests establishment of a radio resource control (RRC) connection to the RAN;

configure, for the second RAN network element, a resource for the establishment of the RRC connection of the terminal; and send, a response message of the second request message to the first RAN network element, wherein the response message of the second request message comprises a notification to the first RAN network element to determine to establish the RRC connection between the terminal and the RAN, wherein the response message of the second request message comprises a first identifier and a second identifier, the first identifier is allocated by the first RAN network element and identifies the terminal within a range of the first RAN network element, and the second identifier is allocated by the second RAN network element and identifies the terminal within a range of the second RAN network element.

26. The second RAN network element according to claim 25, wherein the at least one processor being further configured to:

receive, a second connection establishment complete message from the first RAN network element, a first RRC connection establishment complete message is a message that is received from the terminal before the first RAN network element sends the second connection establishment complete message to the second RAN network element, the first RRC connection establishment complete message comprises a notification to the first RAN network element that the establishment of the RRC connection is complete, and a second RRC connection establishment complete message comprises a notification to the second RAN network element that the establishment of the RRC connection is complete.

* * * * *